(12) United States Patent
Robertson et al.

(10) Patent No.: US 10,338,686 B2
(45) Date of Patent: Jul. 2, 2019

(54) CONTROL SYSTEM USING AESTHETICALLY GUIDED GESTURE RECOGNITION

(71) Applicant: DISNEY ENTERPRISES, INC., Burbank, CA (US)

(72) Inventors: James R. Robertson, Los Angeles, CA (US); Raymond J. Scanlon, Burbank, CA (US); Michael R. Honeck, Glendale, CA (US); Angela Jay, Glendale, CA (US); Cory J. Rouse, Glendale, CA (US); Holger Irmler, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 392 days.

(21) Appl. No.: 15/086,561

(22) Filed: Mar. 31, 2016

(65) Prior Publication Data
US 2017/0285757 A1    Oct. 5, 2017

(51) Int. Cl.
*G06F 3/01* (2006.01)
*G06F 3/0484* (2013.01)
*G06F 3/0482* (2013.01)
*G06K 9/00* (2006.01)

(52) U.S. Cl.
CPC .............. *G06F 3/017* (2013.01); *G06F 3/014* (2013.01); *G06F 3/0482* (2013.01); *G06F 3/04847* (2013.01); *G06K 9/00355* (2013.01)

(58) Field of Classification Search
CPC ...... G06F 3/014; G06F 3/017; G06F 3/04847; G06F 3/0482; G06K 9/0355; G06K 9/00355
See application file for complete search history.

(56) References Cited

U.S. PATENT DOCUMENTS

| 2005/0210417 A1* | 9/2005 | Marvit | G06F 1/1613 715/863 |
| 2005/0215340 A1* | 9/2005 | Stites | A63B 69/3614 473/233 |
| 2010/0306713 A1* | 12/2010 | Geisner | G06F 3/017 715/863 |
| 2012/0146903 A1* | 6/2012 | Arihara | G06F 3/011 345/158 |

(Continued)

*Primary Examiner* — Aaron Lowenberger
(74) *Attorney, Agent, or Firm* — Marsh Fischmann & Breyfogle LLP; Kent A. Lembke

(57) ABSTRACT

A method for facilitating and enhancing computer-based authoring of gesture definitions that are useful in controlling a walk-around character and other systems using gesture controls. The method includes, during performance of a gesture by a performer, collecting sets of raw sensor data each corresponding to differing parameters of the performance of the gesture. The method includes displaying a graphical user interface with a graphical plot of each of the sets of raw sensor data. The method includes receiving user input identifying which of the parameters to include in a gesture definition. The method includes, for the graphical plots associated with the chosen parameters receiving user input defining a starting position, an ending position, a maximum value, and a minimum value. The gesture may involve movement of a performer's arms, legs, hands, head, eyes, and so on in a particular manner.

15 Claims, 9 Drawing Sheets

(56) References Cited

U.S. PATENT DOCUMENTS

| | | | |
|---|---|---|---|
| 2013/0120279 A1* | 5/2013 | Plichta | G06F 3/04883 345/173 |
| 2013/0120282 A1* | 5/2013 | Kukulski | G06F 3/04883 345/173 |
| 2014/0156215 A1* | 6/2014 | Eastman | A61B 5/112 702/141 |
| 2014/0163927 A1* | 6/2014 | Molettiere | A61B 5/0002 702/189 |

* cited by examiner

CONTROL SYSTEM USING AESTHETICALLY GUIDED GESTURE RECOGNITION

BACKGROUND

1. Field of the Description

The present invention relates, in general, to operation of audio and special effects control systems such as, but not limited to, those used in walk-around costumed characters for control over audio and special effects output (e.g., a character may sing or talk when its systems are selectively operated) on such walk-around characters, and, more particularly, to methods and systems for implementing remote triggering or control over any system or device (e.g., audio and special effects systems and the like) such as control over a walk-around character costume (i.e., its audio and/or animating components) to selectively and more effectively trigger audio playback of pre-recorded and stored audio clips in response to a performer performing a particular gesture (e.g., with one or both hands and/or other body movements) that is sensed by sensors that may be worn by the performer and/or provided in or on a costume (note that in this description the term "performer" may be any person performing a gesture such as, but clearly not limited to, a person wearing a costume).

2. Relevant Background

Walk-around or costumed characters are used to entertain and interact with visitors of many facilities including theme or amusement parks such as during meet-and-greet shows and theatrical shows at such facilities. A walk-around character may be provided by an operator or performer wearing a costume including a head that covers the performer's face. The costume head is mounted to or supported on a headband worn by the performer or head-worn suspension or hat suspension may be used to support the costume head. In the head and/or costume, equipment including sound equipment (e.g., a speaker for playing pre-recorded audio) and robotics are provided so that a walk-around character can "speak" with visitors by playing back pre-recorded lines of conversation that may be scripted in advance, by playing live voice from backstage performers, and/or by outputting the in-costume performer's voice to provide a meetable character or "hero" that can also, if desired, be animated to move their eyes, mouth, and other features on their head or face while they talk and interact with the visitors.

In many applications, the walk-around character is representing a character from a movie, a video game, a cartoon, or the like. The visitors expect that character to have a particular or a single voice, e.g., the voice used in the movie, and the quality and believability of this voice-over content often cannot be recreated electronically, e.g., with a voice changer. As a result, the performer cannot use their own voice when they meet and talk with visitors, and, instead, scripted lines and dialog (i.e., audio content) typically are recorded by pre-approved voice talent for each of the walk-around characters to provide the expected voices. Onboard audio or sound equipment in the worn costume is provided to store the audio clips, to allow their ready retrieval, and to provide speakers for local output of the audio content to nearby visitors when the audio equipment is controlled or triggered to play back these lines at appropriate times. The character's head may simultaneously be animated such as by operating robotics to provide mouth movement and eye blinks synchronized to the audio playback.

To allow each walk-around character to speak to visitors, there has to be an effective way to trigger the audio that cannot be detected by the nearby visitors. The triggering mechanism should not be audible to the visitor. In some implementations, control is provided to the performer within the costume or by movement of one or more components of the worn costume such as in response to the performer moving their fingers, hands, and/or other body parts to perform a particular "gesture." In this regard, the quality of a costumed character's performance is not only in the static look of a costume but, very significantly, in how the performer or actor moves and behaves in the costume. This is increasingly true with closer-to-visitor (or spectator) performances. Costumed performers or actors need to simultaneously move and operate various mechanical features of the costume in order to convey character-appropriate movements and gestures such as by manipulating their arms and, particularly, their fingers and hands (e.g., through movement of their fingers in a glove) as many characters "talk" with their hands and related movements.

In the amusement park industry and other industries using walk-around characters, it has become desirable to use computer vision and intelligence tools to give feedback to the performers during both training and live performances. Similar tools can be used to automatically monitor show quality of animatronics and even hand signals and other gestures used by cast members at attractions and elsewhere. Artificial intelligence (AI) systems offer the promise of lower cost monitoring and feedback while at the same time improving the rigor and consistency with which performances are judged.

In practice, however, AI systems must be trained with a very large data set of exemplars that include the entire universe of acceptable gestures and motions. The gestures and motions are captured by in-costume sensors and instrumentation, and this sensor data is algorithmically correlated with acceptable and unacceptable performance of the gestures and/or motions to produce a data model that can be used to judge acceptability of a performance by a performer or actor wearing the costume used to gather the sensor data. Presently, the data models produced fail to effectively capture the aesthetic judgment that is equivalent to a human director. Unfortunately, the data models cannot be readily modified or tweaked to agree with a human director. To adjust the computer model, time consuming and, often, unproductive retraining has been used with larger and larger training data sets to try to improve performance, but performance using the new models is still typically not wholly acceptable to those in the entertainment industry.

SUMMARY

The following description provides a control assembly or system with an enhanced trigger definition to facilitate real-time, interactive, and triggering or control to select and initiate audio, animation, and/or special effects such as for use with walk-around costumes or costumed characters to operate onboard (or "on-costume") components. The description also provides a new method or algorithm (and system) for creating the trigger definitions, which are each associated with a particular gesture (e.g., a set of specific movements or motions) performed by an actor or performer who may be wearing a walk-around costume. The inventors recognized that a technical need existed to devise improved hardware and/or software to control and playback asynchronous audio (e.g., rather than a canned playback of an entire scripted show) and/or to provide animation cues.

The following description uses a control assembly or system of a walk-around costume as a useful example of its implementation, but it will be readily understood that the control system/assembly and associated ideas described herein are not limited to use with a costumed performer and may be used to facilitate gesture-based control by any number of "actors" or "performers" that use gestures to trigger audio outputs or other events (e.g., special effects, robotic movements, and the like). Similarly, the description provides the example of gestures being provided by a performer wearing a glove, but it should be understood that this is just one example of a "gesture" as being one performed with hand movements. However, the invention is not limited to use with a glove form factor as a gesture may be performed in a wide variety of ways and may range, for example, from a single push button up to full-body motion tracking system to provide user or performer input regarding a gesture. The control assembly or system (and associated method) is not limited to a single input source (e.g., a single glove) or to tracking movement of a hand.

Particularly, the inventors determined that the limitations of performers, prior training algorithms, and limited training data sets resulted in data models for AI-based control systems that give too much weight to certain aesthetically irrelevant (e.g., to a director or show designer) movements in some cases. The inventors recognized that one of the main limitations with AI systems is that there is typically an opacity to the AI decision making, and if one does not know exactly what the system is looking for to trigger controls it is difficult to train human operators to perform gestures correctly or to adjust those operators' performances when they are close to correct but not quite correct for recognition by the AI system. In other situations, the data models may give too little weight to some aesthetically relevant parameters defining movements or gestures. In some cases, inordinate focus on this measurable objective criteria has led to costumed performers moving in a particular manner (e.g., performing particular gestures) in way that is technically correct but that provides an aesthetically lacking performance.

One improvement over prior control and training systems/methods provided by the inventors' teaching involves using humans and their input/feedback during training sessions to generalize away from an objectively precise reproduction of a character gesture. The training method or algorithm (or the gesture definition process) provides a manner in which human aesthetic judgment can be used to modify a computer model of a gesture. Stated differently, the training method may be considered a human-assisted AI approach as compared to conventional AI approaches, and the gesture definition (or trigger definition) is used during the training of performers to accurately repeat or perform each of the gestures for a particular costume (for a particular character represented by the costume and a performer) to provide feedback by indicating when a gesture has been correctly performed and, if not, which specific action/movement or parameter defining that gesture was not correctly performed (e.g., moved hand correctly but failed to move one or more fingers correctly during hand motion and so on). The on-costume control system and training system may leverage existing AI hardware and software while making this hardware and software less burdensome and more effective to use.

More particularly, a method is provided for facilitating and enhancing computer-based authoring of gesture definitions that are in turn useful in controlling a walk-around character costume and training performers in the use of the costume and its interactive systems such as its audio playback controller. The method includes, during performance of a gesture by a performer (e.g., the gesture designer/director), collecting a plurality of sets of raw sensor data each corresponding to differing parameters of the performance of the gesture. The method then includes displaying a graphical user interface (GUI) on a display device, and the GUI includes a graphical plot of each of the sets of raw sensor data. The method also includes receiving and storing in memory user input identifying a subset of the parameters to include in a gesture definition (e.g., which sets of plotted sensor data to include in the authored gesture definition). Further, the method includes, for each of the graphical plots for the subset of the parameters in the gesture definition, receiving and storing, in the memory in the gesture definition, user input defining at least one of a starting position, an ending position, a maximum value, and a minimum value (e.g., all or only one or two of these features of interest may be specifically designed by the gesture's author with this method).

In some specific embodiments, the gesture being defined involves movement of a performer's hand in a particular manner, and, in such embodiments, the plurality of sets of raw sensor data include data collected from a set of sensors of a gesture glove. Then, the sensors of the gesture glove may include bend sensors in at least one finger of the gesture glove, a pressure sensor for sensing contact between two portions of the gesture glove, and an inertial measurement unit (IMU) for measuring at least roll, pitch, and yaw of the gesture glove and often acceleration relative to X, Y, and Z-axes. Further, the sets of raw sensor data include data (e.g., in any number of channels such as 1 to 13 channels or more), whereby the differing parameters of the performance of the gesture number from 1 to 13 or more (with one useful prototype using 13 channels of sensor data to generate the graphical plots in the GUI and allowing the author to select one to 13 parameters for defining the authored gesture).

In the same or other embodiments, the user input defining the starting position, the ending position, the maximum value, and the minimum value includes or is provided by the user positioning a set of bounding boxes in each of the graphical plots of the sets of the raw sensor data for the subset of the parameters and sizing each of the bounding boxes. Also, the method may include receiving user input defining for one of the graphical plots associated with the subset of the parameters used in the gesture definition at least one of a must pass window and a must not pass window defining, respectively, an area a plot of sensor data must pass for gesture recognition and an area of a plot of sensor data must not pass for gesture recognition. In these or other embodiments, the method may further include receiving additional user input modifying the stored definition of at least one of the starting position, the ending position, the maximum value, and the minimum value, whereby the additional user input adjusts the gesture definition based on aesthetic or other guidelines.

In some embodiments, the method may involve comparing two gesture definitions, such as with regression analysis, to determine when the two gesture definitions are too similar (e.g., a monitoring assembly may be unable to accurately distinguish when a performer is attempting to perform one versus the other of the two gestures as their movements may satisfy both definitions). When too similar, the gesture definitions are identified for modification such as by the aesthetic director via a GUI as described herein.

The method may also involve performer training using the authored or gesture definition. In such cases, the method may include performing training of an additional performer including: (a) receiving additional sets of raw sensor data each corresponding to the differing parameters of the performance of the gesture by the additional performer; (b) comparing the additional sets of the raw sensor data with each of the graphical plots for the subset of the parameters in the gesture definition to verify the at least one of the starting position, the ending position, the maximum value, and the minimum value are matched; and (c) providing visual or audio feedback to the additional performer indicating whether the performance of the gesture satisfied the gesture definition. In such cases, the providing of the visual or audio feedback may include plotting of the additional sets of raw sensor data relative to the graphical plots of each of the sets of raw sensor data used to create the gesture definition.

DETAILED DESCRIPTION

Figure 1:
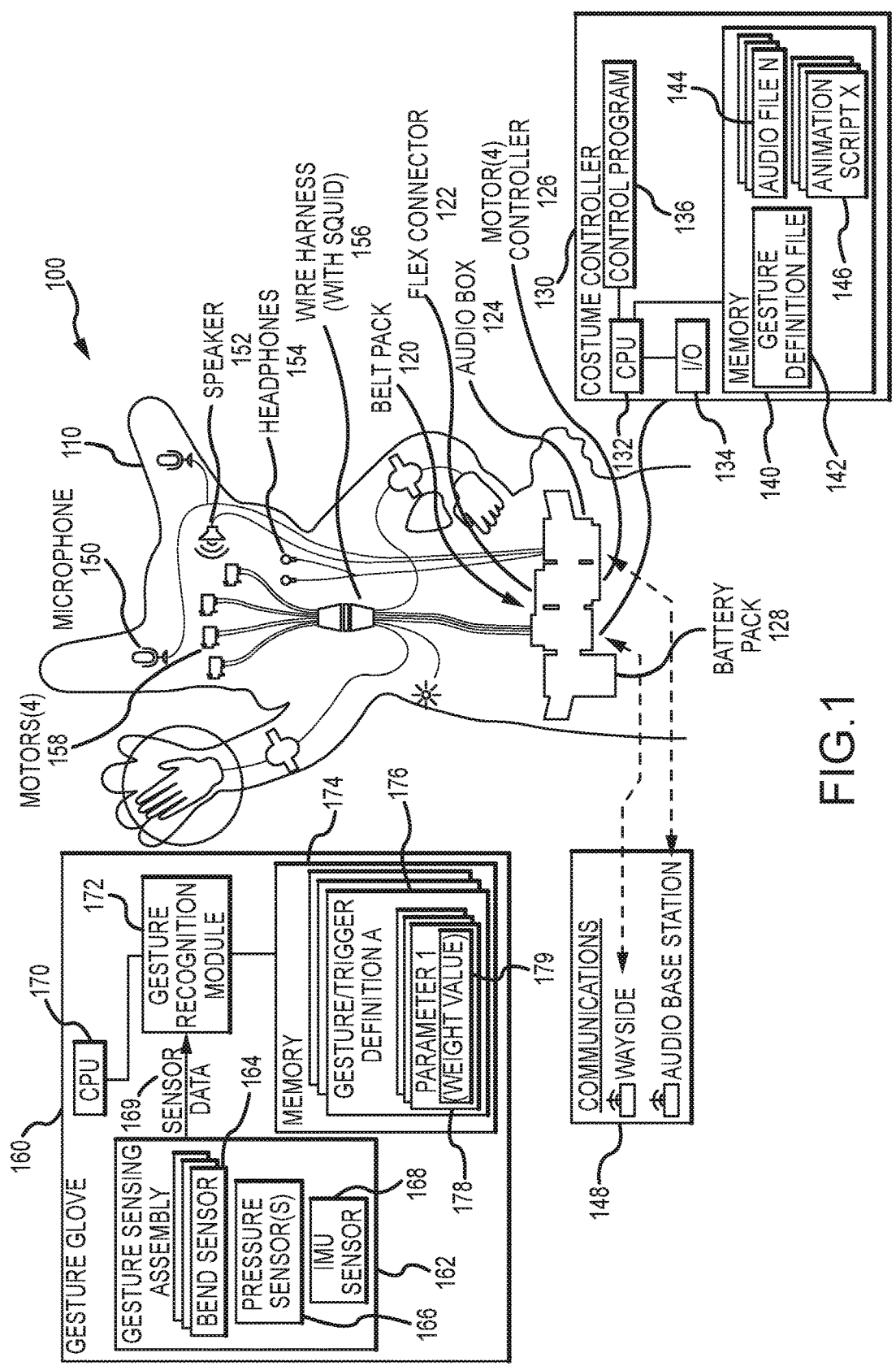
FIG. 1 is a functional block or schematic drawing of walk-around character costume with a control system or assembly adapted for use with the walk-around character costume (e.g., with an articulated or non-articulated head) to facilitate control or navigation of audio playback and/or animation of costume components such as lip and eye movements via onboard motors.

Briefly, the present description is directed toward methods and systems configured to allow a performer, actor, or person, such as but not limited to a person wearing and controlling a walk-around costume (or costumed character), to operate a sound system or special effects/robotics on (or in) the costume to allow the performer, actor, or person to interact with visitors or observers. The methods and systems include processes or algorithms for more accurately and effectively defining a gesture definition (or gesture-based trigger definition), which can then be implemented in the control system, e.g., a control system of a walk-around costume, to cause particular audio files to be played back and/or to cause particular animation scripts to be initiated to operate robotic or special effect mechanisms.

The following description highlights features of the inventive methods and systems by providing details regarding implementations for specific use with a walk-around costume and gestures performed with one or both hands, but these specific examples are not limiting as the ideas may be used with any type of gesture and with a variety of user input devices (single push button up to a relatively complex gesture glove as described up to a full-body motion tracking system providing useful input for recognizing a performed gesture).

In the systems and methods described herein, a character gesture is defined initially by an aesthetic director (e.g., a human operator of the training system) in terms of a desired feature set combined with measurable parameters (or measurable movements/actions) for that gesture. An initial computer model or definition (which provides a gesture definition or trigger definition) is created from a set of raw training data, e.g., measured parameters from in-costume sensors and/or instrumentation (sometimes called "gesture sensors" or "a gesture detection assembly" herein). The training method includes allowing a human operator or aesthetic director to edit or modify the initially-obtained computer model or definition during a training session or method.

For example, an actor or performer may perform the gesture associated with (or defined by) the initial computer model, and the training system may act to compare the performed gesture (which was identified as being performed by the gesture sensors) with the initial computer model or trigger definition. This comparison may result in the performed gesture as being "unacceptable" or outside of the model parameters (e.g., one or more of the parameters was not satisfied or completed by the performer in performing the gesture) or "acceptable" or inside of the model parameters (e.g., all of the parameters were satisfied or completed by the performer in performing the gesture). Then, the gesture as performed can be reviewed by the aesthetic director (human operator of the training system). In some cases, the aesthetic director may disagree with the initial computer model (e.g., believe that the gesture or one or more parameters were actually performed "correctly" even though the model indicates the gesture was incorrect or that it was not aesthetically pleasing or desirable).

The aesthetic director can then provide user input that is used by the training system to refine the initial computer model to create a second or modified computer model or gesture definition. The computer model, for example, can be refined by displaying in a graphical user interface (GUI) of a display device (e.g., a computer monitor or the like) human-readable raw sensor data used to create the initial computer model or gesture/trigger definition. In some embodiments, regression analysis is used to identify which components of the raw data are driving the gesture/trigger definition for a particular feature of interest. The aesthetic director may modify the gesture/trigger definition so that the gesture sensed by the gesture sensors would be acceptable or unacceptable under the new gesture/trigger definition. For example, weighting can be applied to the various measured parameters that make up the gesture performance, and the aesthetic director can provide user input to adjust the weight given to certain parameters when forming the second or modified gesture/trigger definition (or computer model). By giving more weight to a parameter that was previously ignored (or given less weight) or by giving less weight to a parameter that was previously emphasized, the gesture/trigger definition (or computer model) can be refined or "tweaked" based on user input to account for the aesthetic director's opinion and desires.

FIG. 1 is a functional block or schematic drawing of a control system or assembly 100 (e.g., including at least costume controller 130 and the gesture glove(s) 160) adapted for use with the walk-around character costume 110 (e.g., with an articulated or non-articulated head) to facilitate control or navigation of audio playback and/or animation of costume components such as lip and eye movements via onboard motors 158. The control system 100 includes a belt pack 120 with a flex connector 122 supporting and/or interconnecting an audio box 124, a motor controller(s) 124, a battery pack 128, and a costume controller 130 for positioning these component on a performer's or actor's waist (e.g., upon the waist of the human operator or wearer of the costume 110). The control system 100 further includes microphones 150, one or more speakers 152, headphones 154, wire harness or assembly 156 communicatively linking in a wired manner (but wireless communication could be used in some cases) the components of the control system 100, and one or more robotic or special effect drive motors 158. During use, the microphones 150 can be used to capture environmental sounds near the costume such as the speech of a nearby visitor to allow more accurate interaction, and this captured sound can be communicated (as shown at box 148 to a wayside station or base station) and also to the performer via headphones 154. Further, the control system 100 includes a gesture glove 160 (for wearing on one or both hands of the performer/actor wearing the costume 110).

The costume controller 130 is shown to include a processor(s) 132 that manages input/output devices 134 that may include wireless transceivers for communicating (as shown in box 148) with wayside and/or base stations remote to the costume 110. These communications may be used to trigger audio or animation on the costume or this may be handled solely by the control program 136 (software and/or firmware) run by the processor 132, and the communications 148 may provide instructions to the wearer of the costume 110 (e.g., to instruct them to move to a new location or to perform certain gestures and so on to interact or entertain visitors of a theme park or other facility).

The processor 132 also manages operations of memory/data storage devices 140 to store a gesture definition file 142 (which may be downloaded from the base station via communications 148 and/or from a training system (as described below)), audio files 144 (or these may be stored in the audio box 124), and animation or special effects scripts 146. In some embodiments, the gesture definition file 142 is downloaded to the gesture gloves 160 (as shown with gesture/trigger definitions 176) for use (by a local controller) in determining when a gesture is performed/completed by a performer wearing the costume 110. The gesture definition file 142 includes a set of gesture or trigger definitions (or computer models) that define for each of a number of parameters (which can be sensed/measured by a gesture sensing assembly 162) values that must be achieved to perform the gesture (e.g., a maximum value or magnitude, a minimum value, and/or range of values). Weights may be assigned to each of these parameters for use in evaluating whether raw sensor data should be found to indicate a gesture was "correct" according to the definition/model in the gesture definition file 142.

When a gesture is correctly performed (as indicated, in some cases, by a gesture completion signal from the gesture glove 160 (or its gesture recognition module 172) or as a determination by the control program 136 by comparing raw sensor data from assembly 162 to each of the gesture definitions in the file 142, the control program 136 acts to generate control signals to play back an audio file 144 paired to the completed gesture and/or to perform animation or a special effect based on a script 146 paired to the completed gesture. The control signals may be sent, for example, to the audio box 124 to cause an audio file to be output via the speaker(s) 152 (e.g., to cause the character to talk, say a line, to sing a song, and so on) or to the motor controller(s) 126 to cause one or more of the motors 158 to operate to animate or move portions of the costume 110 (e.g., to move a characters mouth/lips, eyes, eye lids, eye brows, and so on).

The control assembly 100 is adapted to identify when a performer wearing the costume 110 performs one or more gestures (e.g., one embodiment is used to detect performance of one of 20 to 40 gestures). A gesture generally may be made up of movement of one, two, or more portions of the costume (or the performer's body parts) in a predefined manner over a predefined time period (e.g., over a period of less than one second up to 2 to 5 or more seconds with one embodiment using time periods of 2 seconds). The control system 100 detects gestures made with the performer's hands via one or two gesture gloves 160, but other embodiments may also sense other movements meeting parameters defining a particular gesture (such as head movement, leg movement, torso movement, arm movement, and the like). Specifically, the control system 100 includes at least one gesture glove 160 that is worn by a performer or actor (not shown). The glove 160 includes a gesture sensing assembly 162 configured or adapted to monitor movement of the performer's hand in space and also to monitor movement and positioning of the performer's fingers.

To this end, the assembly 162 is shown to include one or more bend sensors 164, one or more pressure sensors 166, and an inertial measurement unit (IMU) 168 that collect raw sensor data 169 that is communicated (e.g., via a wired connection) to a processor 170 for processing by a gesture recognition module 172 (software and/or firmware) run or executed by the processor 170. The IMU 168 is used to sense hand movement in roll, pitch, and yaw and may provide this information via nine channels or signals (e.g., provide 9 parameters that may be measured and monitored to define a gesture). In an exemplary embodiment, the glove 160 includes three bend sensors 162 (but more or less may be used) measuring bending of three of the glove (performer's) fingers (such as the fore to ring fingers) and a single pressure sensor 166 measuring contact/pressure between the glove (performer's) thumb and forefinger (but, again, more or less pressure sensors may be used). In this example, thirteen sets (or channels) of data are provided in the raw sensor data 169 provided to the gesture recognition module 172 on an ongoing basis. The frequency of sampling by the sensing assembly 162 (or the gesture recognition module 172) may be varied to practice the system 100, but, in one embodiment, 50 Hertz (Hz) sampling is completed to provide, for example, 100 samples over a 2 second monitoring time period and with the set of sensor data 172 compared with each of the gesture/trigger definitions 176 stored in memory 174. In one prototype, the gesture recognition module 172 was able with this sampling rate to provide gesture recognition or trigger signals at a speed or rate so that there was only a 20 millisecond delay measured between performance of a gesture and audio/animation playback initiation.

This may involve the gesture recognition module 172 comparing the thirteen parameters/channels against definitions/values for each of these parameters 178 in the gesture/trigger definition 176 and, in some cases, assessing an assigned weight 179 to one or more of the parameters 178 to determine whether or not a gesture 176 has been performed correctly. If yes, the gesture recognition module 172 acts to transmit a trigger signal to the costume controller 136 identifying which gesture has just been performed, and costume controller 136 responds with generating and transmitting audio playback and/or animation signals as discussed above (again, some embodiments may provide the gesture recognition function in the costume controller 139 with control program 136 instead of at glove 160 or the control program 136 may be used to verify that 2 or more gestures have concurrently or sequentially occurred prior to triggering audio file 144 or animation script 146 playback such as requiring a performer to make the same or differing gestures with each of their hands as can be detected/sensed as discussed above for gesture glove 160).

Figure 2:
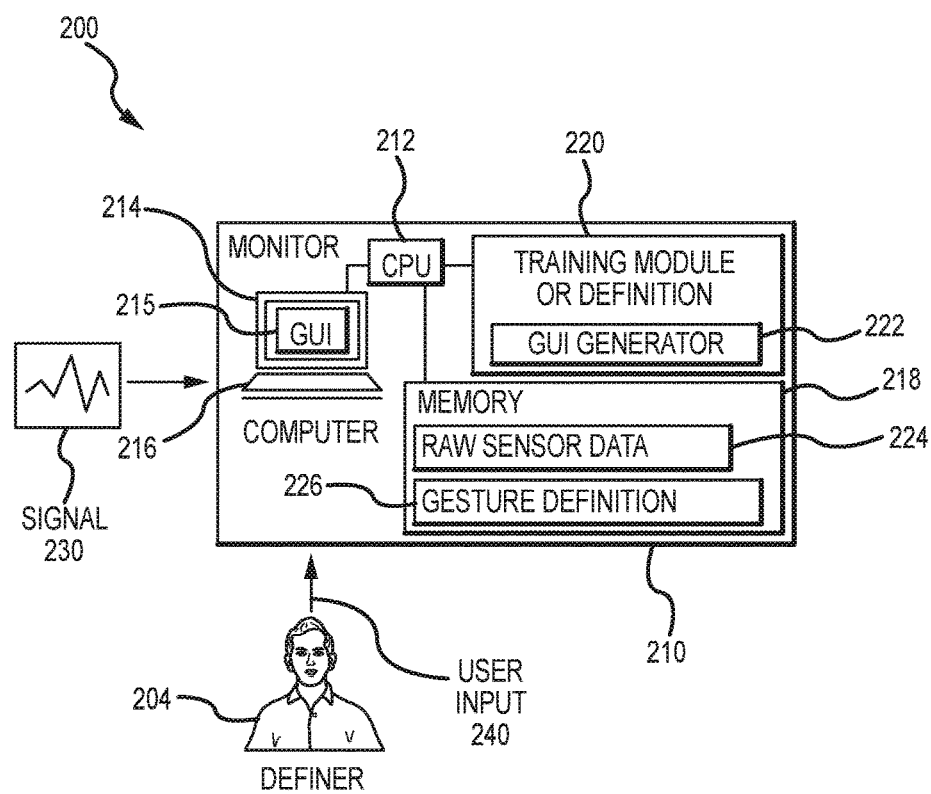
FIG. 2 is a functional block diagram of a gesture training or definition system during its use by an aesthetic director (e.g., a human user, operator, or "definer") to create a computer model or definition of a gesture.

FIG. 2 is a functional block diagram of a gesture training or definition system 200 during its use by an aesthetic director (e.g., a human user, operator, or "definer") 204 to create a computer model or definition 226 of a gesture that can be performed, preferably, in a repeatable and lifelike (for the character) manner by a human performer or actor (such as one wearing a walk-around costume as shown in FIG. 1). As shown, the system 200 includes a computer 210 with a processor(s) 212 that manages operation of a monitor or display element 214 such as to display a graphical user interface (GUI) to allow the definer 204 to more easily enter user input 240 by visualizing sensor data to define values of a parameter to define a gesture. The computer also include I/O devices 216 (such as a keyboard, a mouse, a touchscreen, and the like) for enabling a user 204 to provide user input 240 (e.g., to modify or tweak a gesture definition 226). The processor 212 executes code or instructions to provide a training (or definition) module 220 assisting the definer 204 in creating one or more gesture definitions that are then stored as shown at 226 in memory/data storage 218 of the computer 210 (or memory accessible by the computer 210). In this regard, the module 220 is shown to include a GUI generator 222 for generating a gesture definition GUI 215 that can be displayed on the monitor 214 by the CPU 212 during gesture defining processes (as shown at 300 in FIG. 3).

In use of the system 200, a set of raw sensor data 230 is received by the training module 220 from a gesture sensor assembly (not shown in FIG. 2) such as from an IMU, bend sensors, pressure sensors, and the like useful for measuring movements by a human performer. As discussed, the data 230 may be provided as signals on a plurality of channels (e.g., thirteen channels of parameter data may be provided by a gesture glove), and the raw sensor data 224 is stored in memory 218 for processing to generate a gesture definition 226. Specifically, the gesture training (or definition) module 220 may operate, including generating GUIs 215 with generator 222, to perform the steps of a gesture definition or training method to initially define a gesture (e.g., to create an initial computer model defining parameter values over a time period for a particular gesture) and then allow the definer 204 to refine or modify it with user input 240 to create a second or modified gesture definition (which can then be used to train performers and also downloaded to a costume for use in trigger recognition for audio or animation files).

Figure 3:
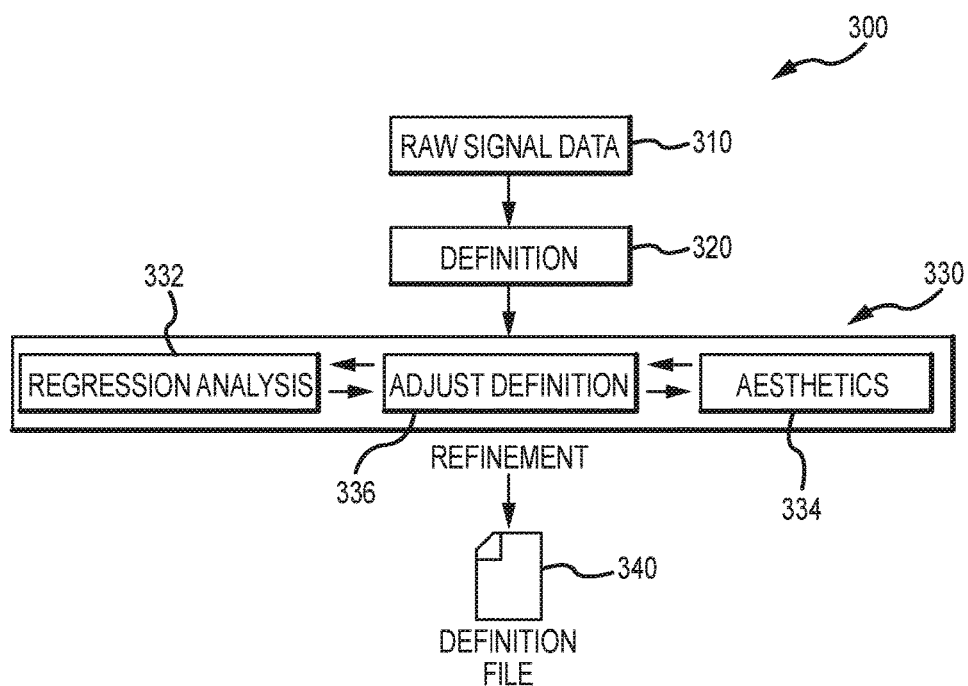
FIG. 3 is a flow chart showing steps of a gesture training or definition process that may be completed by operation of the system of FIG. 2.

As shown in FIG. 3, the gesture training or defining method 300 begins at 310 with the collection of a set of raw signal or sensor data from a gesture sensing assembly (such as assembly 162 of FIG. 1). For example, a definer or director may define a gesture that they wish a performer/actor who wears a costume to perform to trigger playing of an audio file (e.g., to cause the costumed character to speak a prerecorded line to a nearby visitor to entertain or interact with that visitor). With a gesture glove this could include making a first or bending a subset of the performer's fingers and moving or positioning the hand with regard to yaw, pitch, and roll in a predefined pattern. An IMU, bend sensors in the fingers of the glove, and a pressure sensor can then be used to provide the raw signal data 310 when the predefined gesture is performed a predefined number of times (e.g., to provide "averages" of parameter values for the thirteen channels of data in the gesture glove example described above).

The training/definition module 220 may then act, as shown in step 320, to process this raw signal data to create an initial computer model or definition of the gesture (which may be stored as shown at 226 in memory 218 of the computer 210). Instead of simply utilizing this computer model/definition from step 320, however, the method 300 continues at 330 with refining or modifying the initial gesture definition from step 320. Initially, at 332, a regression analysis may be performed to refine or adjust the initial definition as shown at 336, and this regression analysis 332 may involve identifying which components of the raw data from step 310 are driving the definition for a particular feature of interest. The refining step 330 may also involve the definer 204 providing user input 240 to adjust at step 334 (such as by modifying a weight assigned to a parameter or modifying a bounding box to define a region of interest relative to the feature of interest in the raw signal data) the definition as shown at 336. The result of the definition adjustments 336 in the refining step 330 based on regression analysis 332 and user input refining aesthetics 334 of the gesture produces is a modified (or refined) or second computer model of the gesture (or a second or modified gesture definition), which can be output from the training module 220 as a gesture definition file 340. This process 300 is repeated for each gesture that is to be used to trigger operation of a costume control system (e.g., to trigger audio file playback or the like in system 100 of FIG. 1), and the definition file 340 may include 1-to-many gesture definitions that have each been modified or trained to not only fit raw signal data but also to match aesthetics of a director or show designer.

Figure 4:
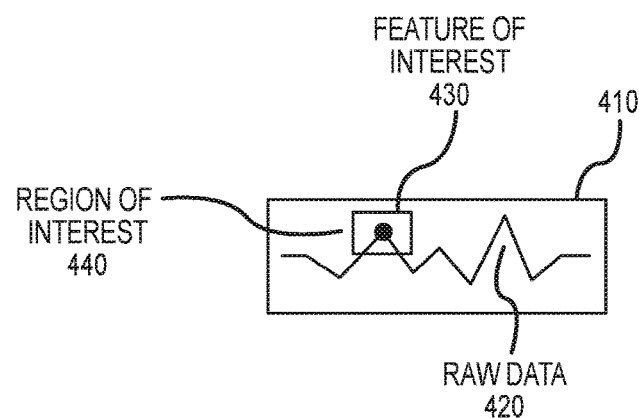
FIG. 4 is a simplified view of a GUI or portion of a GUI that may be provided to a definer during use of the system of FIG. 2 to assist in refining a definition of a gesture.

FIG. 4 illustrates a GUI 410 (or window 410 of a GUI) that may be displayed on a monitor of a training or definition system (such as system 200 of FIG. 2) to assist a user (or definer 204) in providing user input (such as input 240) to modify or "tweak" the gesture definition. As shown, the GUI 410 includes a graphical representation of the raw data 420 from a single sensor (or single channel) and a similar representation of raw data may be provided for each sensor output channel from the gesture sensing/monitoring assembly. This shows that over a length of time (e.g., during a data collection window) the data varies such as with peaks and valleys created by the measured maximums and minimum values sensed by a sensor over a monitored time period. The GUI 410 is useful for allowing a user to identify a feature of interest 430 in the raw data that can be used to define for one monitored parameter a value (or range of values) that can be used to define a gesture.

For example, the feature of interest 430 could be associated with a measurement of a pressure from a pressure sensor that is greater than some predefined amount (or that is associated with squeezing a thumb against a forefinger in a worn gesture glove) or may be an amount of bending of a bend sensor on a finger of gesture glove that is associated with an amount of bending of a finger of the hand wearing the glove that is desired for a gesture. The user can then define a region of interest 440 capturing or bounding the feature of interest via operation of the training module 220, and this bounding box definition of the region of interest 440 can be used to determine whether or not a set of raw data 420 satisfies a parameter for a gesture. The bounding box 440 may set a start and stop time as well as a range of values for the parameter that have to be satisfied during this time period to satisfy the parameter. The user may choose a subset of the monitored parameters (or signal/data channels from the gesture sensing assembly) to define a parameter, and then one, two, or more bounding boxes can be used to define values of that parameter that have to be found in a set of raw data to satisfy the parameter (or decide that a gesture has been performed by a performer wearing a gesture glove, for example).

As can be seen from this discussion of FIGS. 1-4, a useful feature of the present control and training system and method is that it provides a unique and effective way to go from raw sensor data to a trigger definition or computer model for use in controlling a walk-around character costume. The system and method allow a human operator to provide aesthetics-based guidelines to define each gesture with the following in mind: (1) want the trigger gestures to be trainable (e.g., gesture should not be so unusual that it is difficult to perform or that it is non-intuitive so hard to remember or reproduce even after seeing another perform it); (2) want the trigger gestures to be repeatable (e.g., once a performer has been trained, can they perform the gesture again and again successfully?); and (3) want the gestures to be appropriate for a particular character and/or costume design (e.g., would the gesture be performed by this character? and can a performer wearing the costume easily perform this gesture?).

In general, each gesture definition may include a starting position for one or more body parts of the performer (e.g., starting position for the performer's fingers and hand in the case of a gesture glove worn by a performer). Each gesture definition will also include an ending position for these same body parts of the performer (e.g., a finger may be straight or unbent at the starting position and then be bent a certain amount at the ending position or vice versa). The gesture definition may also include a time position for the same body parts that defines a particular position for those body parts at a time (or within a time period or window) between the starting and ending times (that correlate with the starting and ending times of the gesture performance window. The gesture definition may also include a magnitude of the maximum and minimum values of the sensor data or signal (of a channel) between the starting and ending positions.

To create and "train" a gesture definition, the definer can first choose a start and end position for the gesture. Then, the definer can perform (or have another human performer perform) the gesture with sensor data being collected during the gesture performance. Next, the definer may interact with the training or defining module (or AI software) to mark the raw data in each of the channels as being applicable to the gesture and its definition, can use bounding boxes or similar devices to identify features of interest and magnitudes of parameter sensor or parameter values during a time period (or as a maximum/minimum of that parameter between start and end positions and start and end times). The definer can then adjust or "train" the gesture definition. The method of detecting or identifying successful completion/performance of a gesture by a performer can be thought of as a rolling window process.

The detecting method involves (on each of the active channels/parameters) looking for a good starting point in the sensor data (e.g., channel data with a value/magnitude falling within a starting position bounding box). Once a starting position is identified, the process involves looking for data that matches the maximum and minimum values identified for one or more time positions between the start and stop times/positions. Further, an ending position is identified in the sensor data (e.g., channel data with a value/magnitude falling within an ending position bounding box). Each of these four aspects of a gesture definition are optional as a definer/director may only set one, two, or three of these four aspects as being required to perform the gesture (or satisfy this parameter or portion of the gesture). A gesture definition may also include a definition of a range of parameter values (e.g., with a bounding box or the like) that cannot be satisfied to successfully complete this aspect/parameter of the gesture (e.g., define a "can't pass" bounding box through which the raw data signal cannot pass) and/or a range of parameter values (e.g., with a bounding box or the like) that must be satisfied to successfully complete this aspect/parameter of the gesture (e.g., define a "must pass" bounding box through which the raw data signal must pass). The number of bounding boxes that can be used may vary to practice the invention with some embodiments allowing a number in the range of 4 to 10 boxes (e.g., with one embodiment utilizing 8 bounding boxes to define each parameter model or definition). Note, while bounding boxes are an excellent way to visualize the gesture definition, graphical and other techniques may be used to define similar information (e.g., to set time ranges and parameter value or value ranges) over a sensor data collection window.

For example, the definer may perform the gesture again to determine if they can repeat the gesture as presently defined or if it is aesthetically pleasing to them if performed acceptably/correctly per the present gesture definition. The definer or director can open up (or loosen) parameter definitions to make the gesture easier to repeatedly perform (e.g., enlarge a bounding box so as to increase the range of time when a portion of the gesture can be performed, enlarge a bounding box to increase the range of values that can be sensed to meet/perform a particular action that is a feature of interest within a predefined time period, and so on). The definer or director may also change or modify parameters to have the gesture performed more like the character associated with the costume would perform this gesture. In other cases, the definer or director can change the definition of the gesture if it is too easy to satisfy as this could result in false triggering of a costume operation, which would be undesirable in many applications. The training is, hence, an open and iterative process that allows a human operator to provide user input to edit the computer model or gesture/trigger definition.

Once the gesture definition is modified to create a modified gesture definition (or aesthetically guided gesture/trigger definition), the modified gesture definition can be used to train performers to accurately and repeatedly be able to perform the gesture. For example, the performer can be monitored by a gesture sensing assembly while they attempt to perform the gesture (e.g., wear a gesture glove), and the training or definition module of the training system may operate to determine if the sensor data satisfies the definition in each of the signal channels (or each of the parameters measured by the sensors) marked as necessary by the definer/director. In some embodiments, each of the "active" or marked channels of data/signals is treated equally such that if the data from the sensors fails any of the channel-by-channel (or parameter-by-parameter) definitions of the gesture definition, the gesture is not "found" and a trigger signal would not be generated.

An overlay of the data from each of the active channels/parameter values may be provided to the performer as immediate feedback such as in a training GUI provided by the training module (e.g., module 220 in system 200 of FIG. 2). This provides a visual indicator of why the performer's performance of the gesture was successful/accepted as a triggering movement or was deemed to fail. In some embodiments, the GUI may provide other feedback signals such as red and green lights associated with each of the active channels/parameters, which quickly directs the performer to the aspects of their performance that were successfully performed to the gesture definition and which were not adequate (and the overlay of their data in that channel/parameter helps to show the point where failure or variance from the definition for that channel/parameter strayed from the desired value). The performer can then repeat performance of the gesture to try to correct any deficiencies or to verify that they can successfully repeat their performance of the gesture according to the gesture definition (e.g., that they will be able to trigger a particular costume operation when they are in the field). As discussed above, a trigger definition may require that two or more gestures be performed concurrently or in a particular order (and within a particular time period), and the training module may be used to train the performer to perform these two or more gestures (and a controller later would use the modified gesture definitions for each of these gestures to determine when a trigger for the costume operations has occurred by processing gesture sensing assembly data).

At this point in the description, it may be useful to provide a more detailed explanation of an exemplary, but not limiting, implementation of a prototype training or definition module (such as module 220, which may be also labeled a gesture definition authoring tool or application (or simply "authoring tool") in the following discussion). Particularly, the authoring tool is described as it may be used for defining a gesture for a performer's hand, and the movements and positioning of the features of the performer's hand being monitored or sensed by a gesture glove configured for 13 channels of data or for obtaining values/data regarding 13 different parameters. These 13 parameters or data channels can then be used by a user or operator of the authoring tool to effectively define a gesture based on aesthetic characteristics of the performed gesture.

The authoring tool is an application that is well-suited for authoring gestures for walk-around characters' gesture recognition systems (or control systems such as system 100 of FIG. 1). It can also be used to train performers to execute the authored gestures (also called "modified gesture definitions" herein such as with reference to FIGS. 2-4). Briefly, with regard to how it works, gestures are recognized using a set of sensors on a gesture glove worn by performers. The data sensors' data is fed into the glove's recognition software (such as gesture recognition module 172 in FIG. 1), which matches the recognized or identified gesture with gesture definitions to determine whether or not a particular authored gesture was successfully executed.

Figure 5:
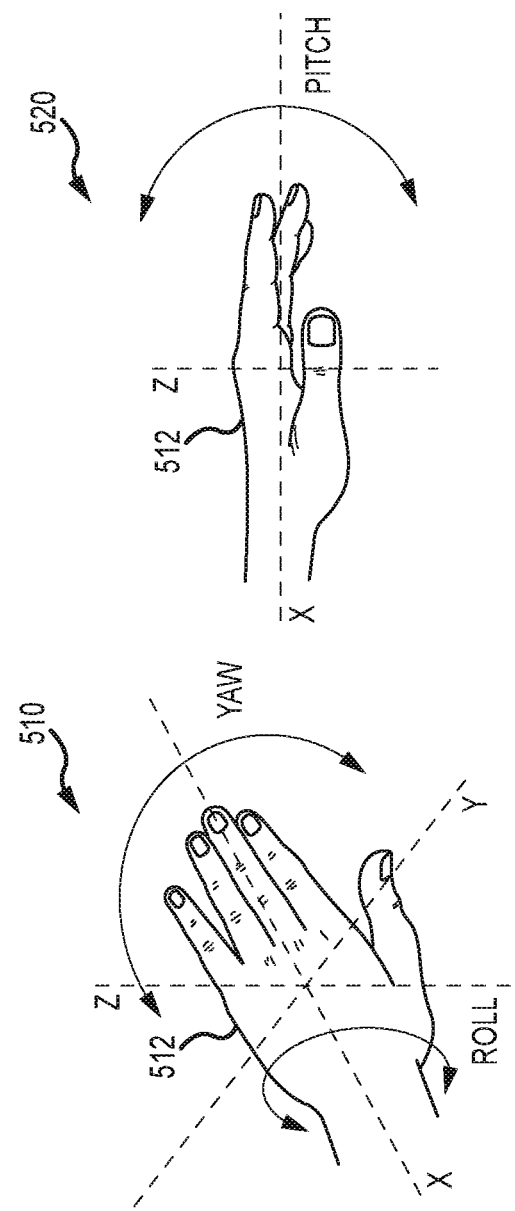
FIG. 5 provides graphical representations of a hand as it moves through roll, pitch, and yaw and with acceleration relative to the X, Y, and Z axes.

Particularly, FIG. 5 provides graphical representations or top and side views 510, 520 of a hand 512 as it moves through roll, pitch, and yaw and with acceleration relative to the X, Y, and Z axes, and the sensors of the gesture glove are used to measure these movements or positioning of the hand and fingers when a performer wears the gesture glove and performs/executes one of the authored gestures (or attempts its execution). In one embodiment, the gesture glove includes the following sensors: (1) a yaw sensor measuring change in rotation on the Z-axis that goes from the palm of the hand 512 out through the back of the hand 512 (e.g., turning a dial); (2) a pitch sensor measuring rotation on the X-axis that goes from the left side on the hand 512 out through the right side of the hand 512 (e.g., patting a surface); (3) a roll sensor measuring rotation on the Y-axis that goes from the wrist out through the fingertips (e.g., flipping the hand 512 over); (4) an X-acceleration sensor measuring acceleration along the X-axis; (5) a Y-acceleration sensor measuring acceleration along the Y-axis; (6) a Z-acceleration sensor measuring acceleration along the Z-axis; (7) an X-rotation sensor measuring rotational acceleration around the X-axis; (8) a Y-rotation sensor measuring rotational acceleration around the Y-axis; (9) a Z-rotation sensor measuring rotational acceleration around the Z-axis; (10) a thumb sensor measuring the amount of bend or pressure on the thumb (e.g., from a finger; (11) an index finger measuring the amount of bend or pressure on the index finger; (12) a middle finger sensor measuring the amount of bend or pressure on the middle finger; and (13) a ring finger sensor measuring the amount of bend or pressure on the ring finger.

With the authoring tool, gestures are defined through the use of a set of channels (or parameters), with one channel (or gesture parameter) for each of the sensors described above for the gesture glove. Each channel has bounds defined that the data plots should pass through or avoid in order to be recognized (by the gesture recognition software or routine, which is a part of the authoring tool as well as a part of the control system for a walk-around character costume) as a successful completion of this portion of the gesture (of this gesture parameter such as proper yaw movement as defined in an authored gesture or gesture definition). The method of authoring or defining gestures is described in more detail below.

Figure 6:
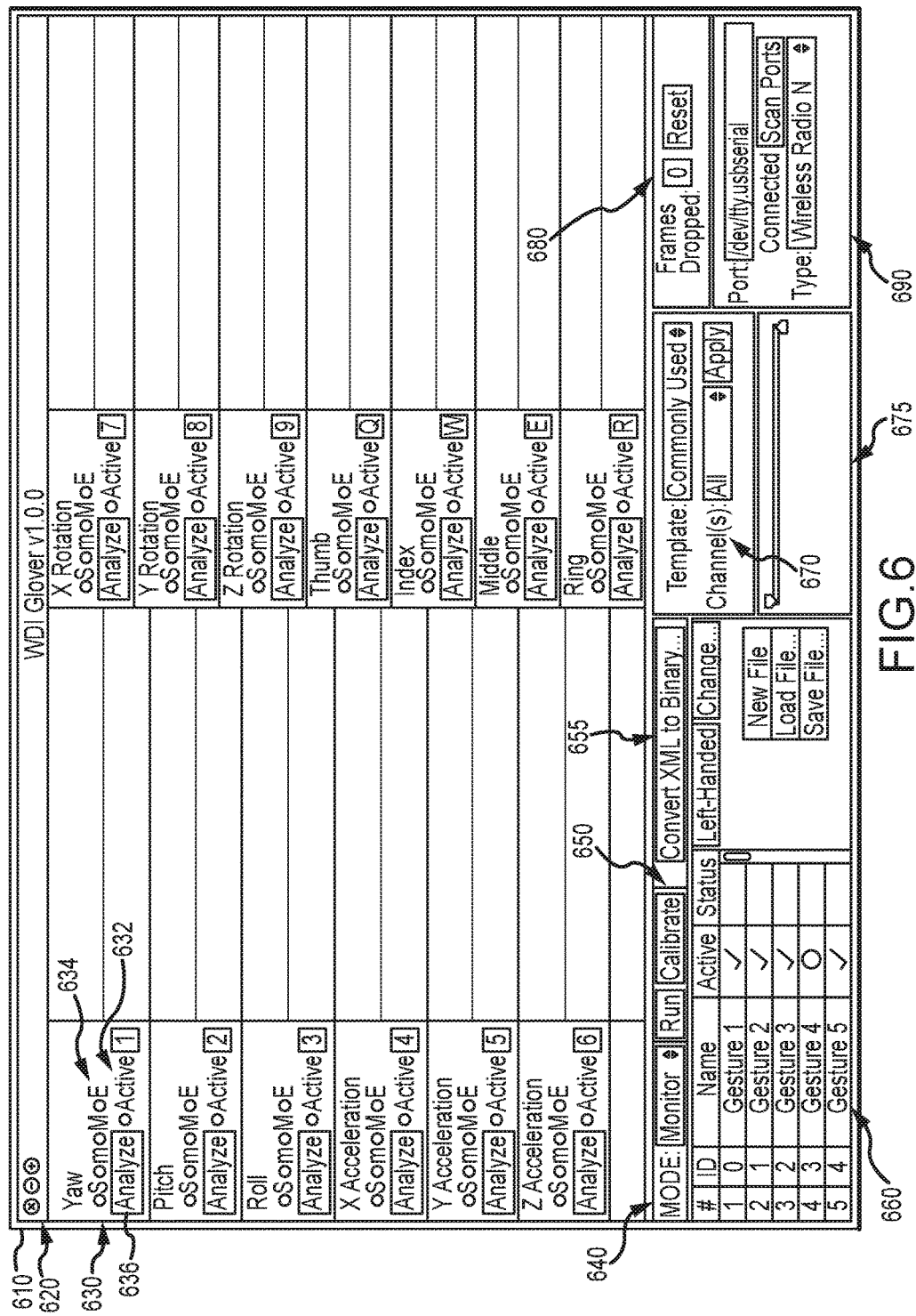
FIG. 6 illustrates a monitor/display element operating to display a window/GUI generated by the authoring tool of the present description.

To further describe the authoring tool, it may now be useful to discuss operations of the authoring tool to generate user input or GUI windows that allow a user (such as a gesture definer or aesthetic director) to define and then modify or tweak definitions of a gesture. FIG. 6 illustrates a monitor/display element 610 operating to display a window/GUI 620 generated by the authoring tool of the present description. In this window/GUI 620, a channel data section or subwindow 630 is provided that is used to display each of the sensors' data as a plot of the data value's magnitude over a time period or data collection window (e.g., amount of bend of the index finger over time in the data collection window and so on for each of the 13 channels/parameters discussed above in this example subwindow/section 630). Buttons 632 and 634 are provided to allow a user, respectively, to enable/disable (make active or inactive) each of the channels or sensor's data in the gesture definition and/or to enable or disable each of the bounding boxes (e.g., starting position, maximum value, minimum value, and ending position).

In section or subwindow 640, the GUI/window 620 of the authoring tool allows the user to select the mode of the authoring tool, with these "modes" discussed in more detail below. Section or subwindow 650 is provided to allow a user to indicate start and stop times for receiving data from the sensors of the gesture glove (e.g., by pressing a run button or switch), and a calibration button is provided for selection the first time a gesture glove is connected with its sensor outputs providing data to the authoring tool. Section or subwindow 655 is provided to allow the user to initiate a conversion tool that may be a script for converting a gesture file from one format to another such as to convert a gesture XML file to a binary file for loading onto a gesture glove's controller (e.g., as gesture or trigger definitions 178 as shown in FIG. 1).

In the window/GUI 620, a gestures section or subwindow 660 is provided that provides a list of authored gestures, and it provides buttons for loading, saving, and creating new gesture files and, in some cases, for switching between right and left hands (or right and left gesture gloves). In an Edit Gestures mode (that can be selected in subwindow 640), the subwindow 660 may be configured to include buttons to create new gestures and for deleting previously authored gestures. In a Recognize mode, the subwindow 660 may be configured to include buttons for showing or hiding a recognition log as well as a light (or similar indicator) for providing visual indication in the window/GUI 620 when a gesture is recognized as being successfully executed or performed by a performer wearing a gesture glove. Subwindow or section 670 is used in the GUI 620 such that in an Edit Gestures mode, templates can be applied by a user to at least initially define gestures. Boundaries subwindow or section 675 is provided such that in an Edit Gestures mode the user can define the length (in units of time or the time period) of the gesture being authored. The boundaries section 675 can be used in the Recognize mode to move a gesture across data plots to see when it matches a set of sensor data (or at least the data in the active channels for that gesture). The frames subwindow or section 680 is used by the authoring tool to display the number of frames dropped while the authoring tool is running in case connectivity with the gesture glove is poor. The serial port subwindow or section 690 is used to allow the user to select a port to be used for receiving gesture glove sensor data and to select a data protocol type for the gesture glove (e.g., default to RS-422 for production gloves while Xbee was used by the inventors for wireless gloves that were used during development of the authoring tool).

The authoring tool may be configured to operate in a number of different operating modes, and the mode may be chosen by the user of the authoring tool via subwindow or GUI section 640. In one implementation of the authoring tool the following operating modes were utilized: (1) monitor mode; (2) recognize mode; (3) edit gestures mode; (4) record raw data mode; and (5) edit templates mode. In the monitor mode, the authoring tool is run without the recognizer application/module, and the user can test the data connection and calibrate the gesture glove in this mode. In the recognize mode, the authoring tool is run so as to recognize or identify any authored gestures that have been loaded and are identified as active. If there are no gestures loaded, the run button provided in section 650 is disabled. The user may calibrate in this mode as well. Authored gestures may be edited in this operating mode, but the user should confirm any changes to the gesture definition to be saved.

In the edit gestures mode, the user can manage authored gestures including adding and recording new gestures, deleting existing gestures, editing existing gestures, reordering gestures, and saving gestures such as to an XML, file. This mode may also be used to switch hands (or switch between left and right gesture gloves). Changes made to authored gestures in the edit gestures mode do not need to be confirmed, but changes to gesture sets should typically be saved to file. In the record raw data mode, the user can record raw data from each channel and save to memory such as to a CSV file. Gestures executed are not recognized by the authoring tool, but the user can manually mark the data with the gesture ID as each gesture is executed and then unmark when the gesture is complete. In the edit templates mode of the authoring tool, the user can manage the list of user-created templates including adding, deleting, editing, and reordering the templates. Upon switching operating modes, the templates will be saved to the user's configuration.

Figure 7:
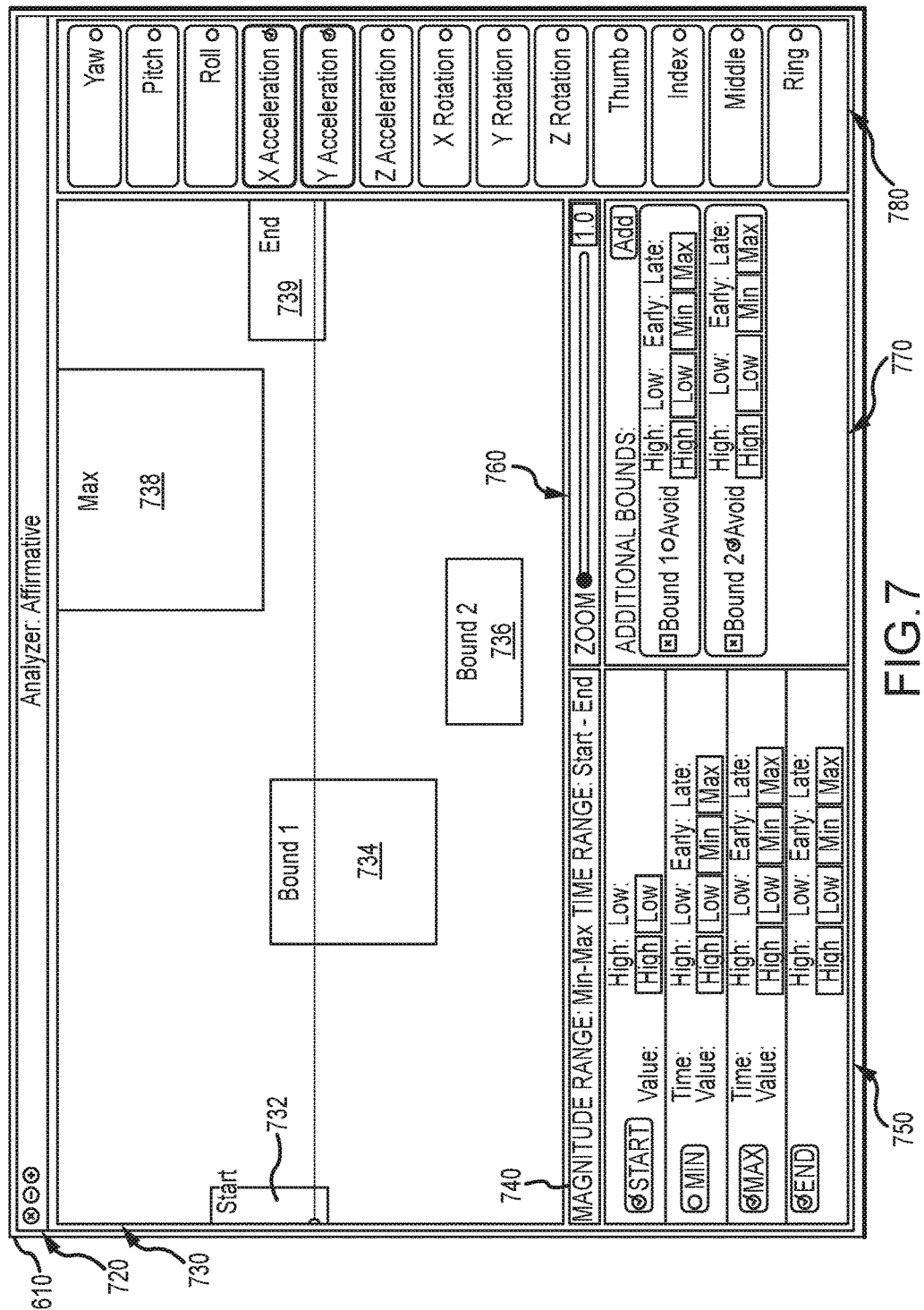
FIG. 7 illustrates the monitor/display element operating to display an analyzer window/GUI generated by the authoring tool.

FIG. 7 illustrates the monitor/display element 610 during its operation by the authoring tool to display an analyzer window/GUI 720 generated by the authoring tool. The analyzer window/GUI 720 is configured to allow the user to view and edit the bounding boxes 732, 734, 736, 738, and 739 for a given channel/gesture parameter. Clicking the Analyze button 636 in the main window 620 shown in FIG. 6 causes the authoring tool to open this view. Section or subwindow 730 provides an analyzer plot, which displays a data plot (here the data line is flat/horizontal) and bounding boxes 732, 734, 736, 738, and 739 for the selected channel in the foreground. Any selected channels in the tabs are also typically displayed in layers in the background. The ranges section or subwindow 740 is used to display to the user range values for the time (X-axis) and the magnitude (Y-axis).

The bounding boxes section or subwindow 750 is used to allow a user to provide user input to enable and manually edit the bounding boxes 732, 734, 736, 738, and 739. This section 750 of the GUI 720 displays the coordinates of the given point (if applicable) and the numeric boundaries of the bounding box. In section or subwindow 760, the authoring tool uses the GUI 720 to allow a user to zoom into the plot in section 730 vertically, and scroll can be used by the user to pan up and down. In section 770 of the GUI 720, the authoring tool allows the user to add additional bounding boxes to the plot in section 770, and the plotted data must either pass through these added bounding boxes (e.g., box 734 in this example) or wholly avoid such boxes (e.g., box 736 in this example). In this way, the authored gesture can include parameters that require a performer to move in a particular way or avoid moving in a particular way during a particular time period within the overall gesture performance window or time period (e.g., avoid moving a finger in a certain way about half way through the gesture performance and so on). In a channel tabs section 780 of GUI 720, the user is allowed to provide input or selections to switch to another channel within the analyzer window/GUI 720 or enable other channels to view underneath the currently active tab's channel.

For a user to get started in using the authoring tool to define a gesture, a gesture glove can be connected by plugging the glove or a wireless receiver for the glove to the computer running the authoring tool such as via the USB port of the computer. The authoring tool can then be started if not already started and the Scan Ports button in the displayed main window/GUI can be clicked or selected. At least one port should then be listed in a ports dropdown list. Next, the user can select the appropriate protocol for the gesture glove type. The user may then continue the startup process by clicking the Run button in the main window or GUI to confirm the data is coming in from the gesture glove and the correct protocol is being used. If no data is plotted or displayed in the channel/parameter plots of the main window or GUI, the wrong port or protocol has likely been selected, and these startup steps should be repeated. Calibration can be performed when the gesture glove is first connected. While the data transport is running, the user can click on or select the Calibrate button in the main window or GUI of the authoring tool. Once data begins to appear in the finger channels, the user or performer assisting the user of the authoring tool can slowly open and close their hands to calibrate the finger bend sensors. The Pause button can then be clicked on or selected to stop the startup process, and the authoring tool is now ready for use in authoring or creating a gesture or trigger definition.

Figure 8:
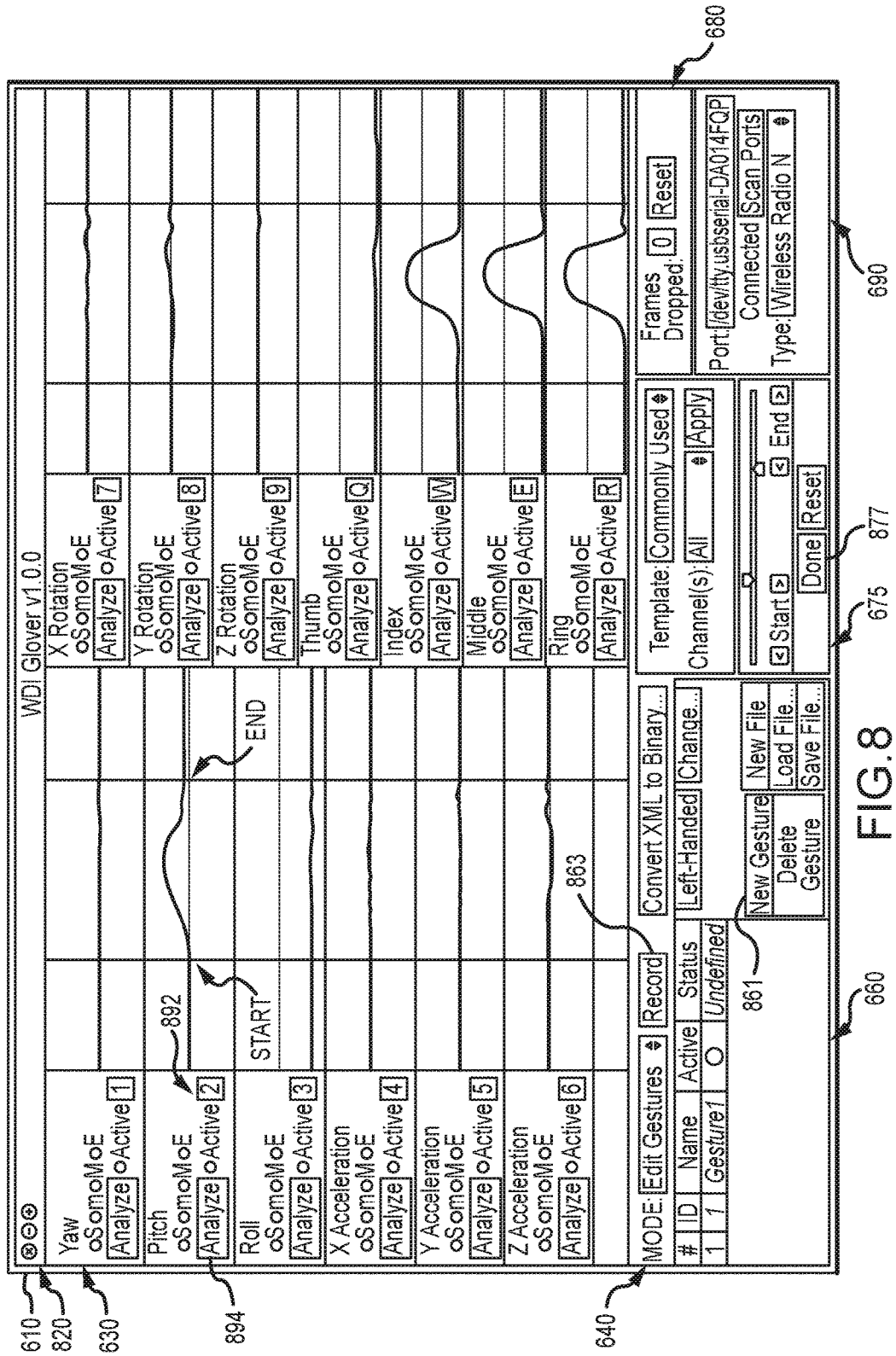
FIG. 8 illustrates an authoring tool window or GUI when the authoring tool is in the edit gestures operating mode.

Gestures can be authored with the authoring tool switched into the edit gestures operating mode (e.g., via a selection in section 640 of the GUI 620 in FIG. 6). FIG. 8 illustrates an authoring tool window or GUI 820 in a monitor 610 when the authoring tool is in the edit gestures operating mode as shown at GUI section 640. To perform recording of a new gesture, a new gesture button 861 can be clicked on or selected in the GUI section 660. A gesture will be added to the list with a default name and the next available gesture ID. The user or an assisting performer wearing the gesture glove can now prepare themselves to execute the gesture to be recorded by the authoring tool. When the record button 863 in GUI section 660 is clicked on or selected by the user (through operation of an I/O device such as a mouse or a touchscreen), the authoring tool will run for a predefined data collection window or time period (e.g., for 2 seconds) and fill the buffer of each channel with the sensor data from the gesture executed. It can be stopped early if the user desires.

The user can also set gesture length. After the gesture is recorded, the plots generated in the GUI section 630 by the authoring tool display for each channel the data that was read during gesture execution and recording. The gesture now should be identified in the plot by the user/definer by adjusting the boundaries of where it starts and ends via user input in GUI section 675. Before the user clicks on or selects the done button 877, the user should activate at least one channel/gesture parameter in the GUI section 630. With regard to activating channels, upon examining the data that was recorded, the user likely will notice that certain channels in GUI section 630 are notable in that there are significant peaks and valleys that can be used to successfully recognize the recorded gesture (or gesture presently being authored by the user of the authoring tool).

In the present example shown in FIG. 8, a "hill" or rounded peak is present in the pitch channel plot in GUI section 630 as well as in the index, middle, and ring finger channels. The gesture executed in this example was a "come here" motion done with the entire forearm rising and lowering as the fingers were bent and then reopened. It is also interesting to note that the roll channel in the GUI section 630 has remained level at a point below the middle of the gesture performance, which indicates the performer's hand should remain in a certain angle of roll throughout the gesture performance (in this case, the palm of the hand would be facing upwards). With the authoring tool, there are two ways to activate channels (include a parameter in the authored gesture). First, the user may check the active toggle button as shown for the pitch channel at 892 in FIG. 8, which will result in the authoring tool activating all four of the main bounding boxes for that channel and automatically positioning and sizing the bounding boxes. Each bounding box can then be unchecked by the user to disable them. Second, the user may click on or select the analyze button 894, which will open the analyzer window/GUI of the authoring tool, which will provide more detailed/complex bounding box definitions.

Figure 9:
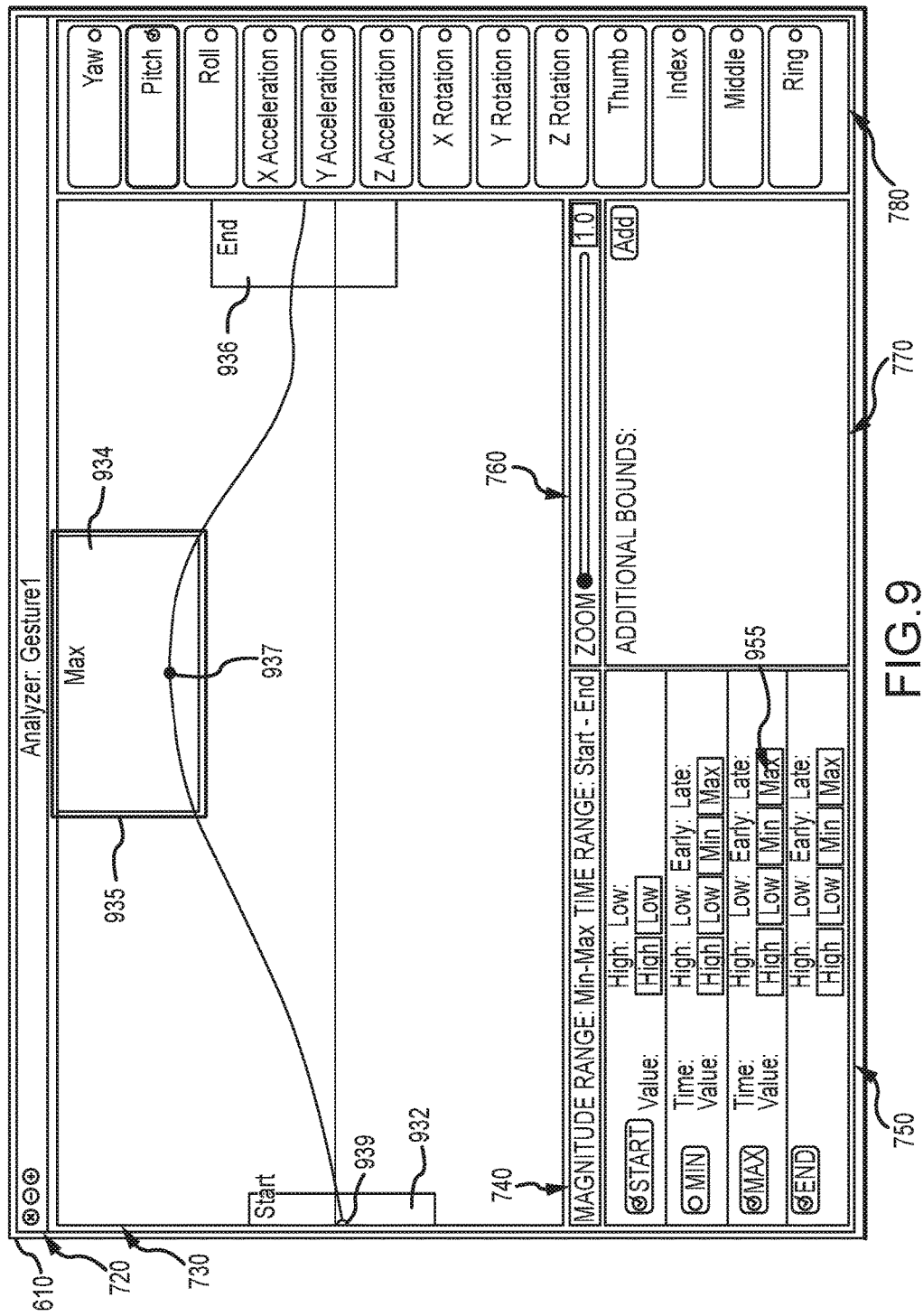
FIG. 9 illustrates the monitor/display element operating to display the analyzer window/GUI as shown in FIG. 7 for a particular gesture being authored by a user with the authoring tool of the present description.

Editing of an initially authored gesture can then be performed using the analyzer window. FIG. 9 illustrates the monitor/display element 610 operating to display the analyzer window/GUI 720 as shown in FIG. 7 for a particular gesture (e.g., the gesture recorded in the example of FIG. 8) being authored by a user with the authoring tool of the present description. As shown in GUI section 750 in FIG. 9, the user is enabling relevant bounding boxes, e.g., starting position bounding box 932, maximum value bounding box 934, and ending position bounding box 936. The bounding boxes can then have their sizes adjusted through user input, either directly on the plot in GUI section 730 by dragging the edges and corners of the box as shown with box outline 935 for edited box 934 or manually by editing the numeric box definition values as shown at 955. The points on the plot in section 730 that indicate the start, minimum, and maximum points (e.g., maximum point shown at 937) can be color coded to match the colored display in GUI section 750. In this example, there is no end point in bounding box 936 because the plot (or sampled data from the gesture glove) only needs to pass through the ending position bounding box 936 to match the gesture definition. It is also possible for the minimum and maximum points to be the same as the start point 939 in some gesture definitions if the lowest/highest point on the plot is at the start of the gesture.

With regard to bounding boxes, the starting position (or start) bounding box typically does not have a time range since the start of a gesture is one point in time. The user may specify a magnitude range with this box in which a gesture needs to fall within to start or initiate the gesture performance. The minimum bounding box is used to define the absolute lowest point in a given plot of sensor data to fall within the box. The maximum bounding box in contrast looks for the absolute highest point in a given plot to fall within the box. The ending position bounding box does not look for a specific point on the plot but, instead, looks for the plot to pass through any point within the box. Additional bounding boxes can be added for gestures that cannot be defined by an absolute maximum or minimum such as repeated motions. When these boxes are used, the plot must pass through any point within the box unless the user selects the "avoid" button or checkbox for that box, in which case the plot must not pass through any point within the box for execution of a gesture to match the authored gesture or gesture definition. Once all the desired bounding boxes have been activated and positioned for each relevant channel by the user, the authored gesture should be marked as done. This locks the length of the gesture so that the start and end thumbs of the boundary slider track each other as the gesture scrubs across the channel plots.

Figure 10:
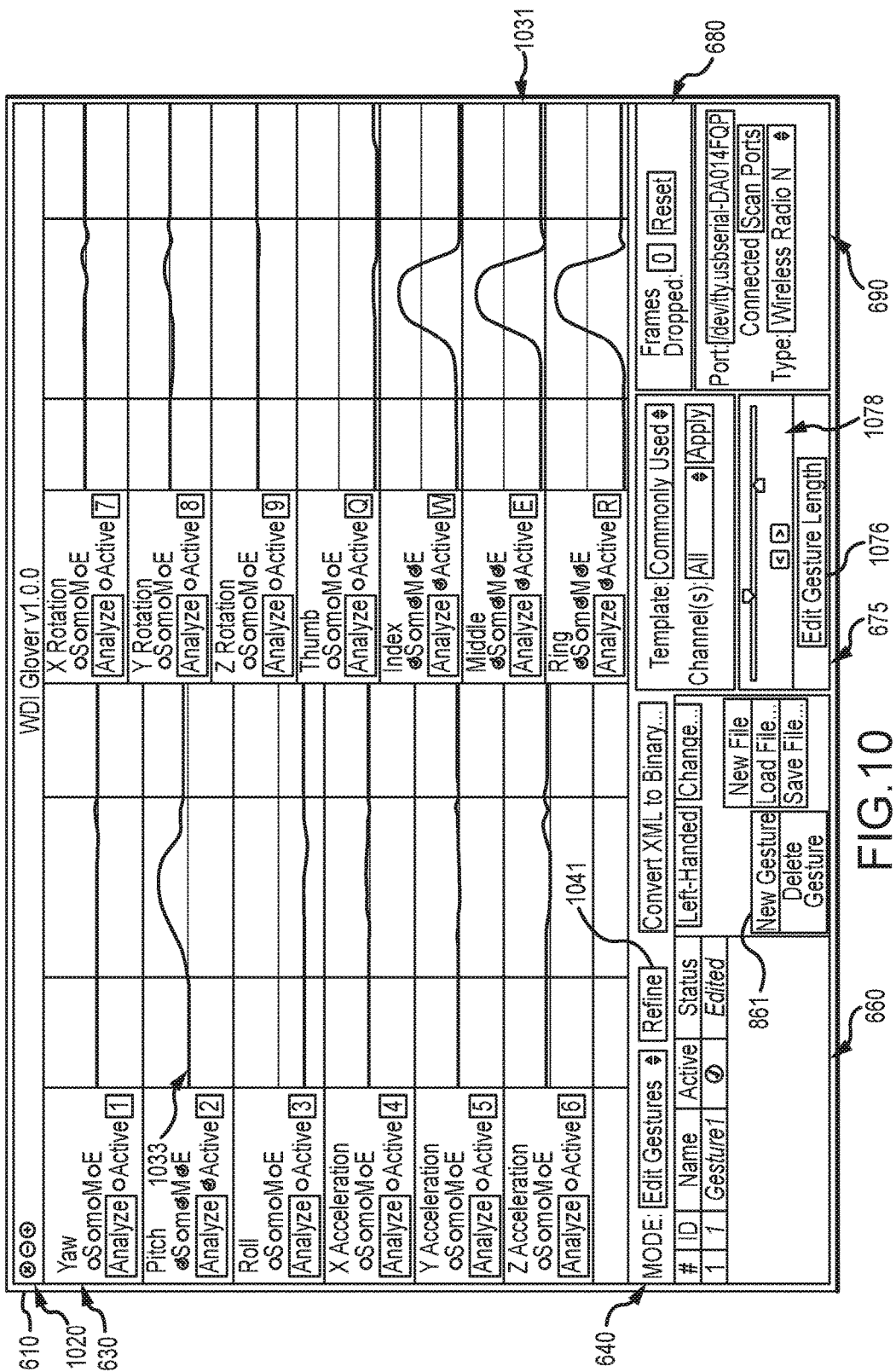
FIG. 10 illustrates an authoring tool window or GUI when the authoring tool is in the edit gestures operating mode and is being used to change gesture length and/or to refine/tweak/modify a previously authored gesture.

The authoring tool is unique in its features that allow a user to edit existing gestures or previously authored gestures. In this regard, FIG. 10 illustrates an authoring tool window or GUI 1020 in a monitor 610 when the authoring tool is in the edit gestures operating mode (as shown in GUI section 640) and is being used by a user or operator of a computer to change gesture length and/or to refine/tweak/modify a previously authored gesture. If after marking a gesture as "done" the user/definer determines they want to modify the gesture's length, the user can click on or select the edit gesture length button 1076 in the GUI 1020. Bounding boxes will not shift with the change in gesture length; however, if a gesture becomes shorter than where a bounding box was previously positioned, the bounding box will be removed by the authoring tool and the point disabled. If the gesture length only partially cuts off the bounding box, it will remain in the gesture definition but it will be shortened. Whenever changing the length of a gesture (e.g., from 2 seconds to 1 second or 1 second to 0.5 seconds in length or the like), the user should open each channel in the analyzer window/GUI to ensure the bounding boxes have not been inadvertently removed.

With regards to tweaking/modifying authored gestures or gesture definitions, the user may decide, based on their aesthetic opinion or for other reasons such as the gesture not being easy to repeatedly perform, that a gesture definition is not quite right or the first plot recorded in order to define the gesture was not quite right. In such cases, the user may refine the gesture definition by re-recording the plot. First, the user can select the previously authored gesture. Then, the refine button 1041 may be clicked on or selected by the user, which the authoring tool will respond to by running for a pre-defined time period/sensor data collection window (e.g., for 2 seconds) to fill the plot buffer and stopping automatically. Once stopped, the user may move the gesture across the channel plots in GUI section 630 by scrubbing the boundary slider 1078 to match where the gesture was executed to allow the user to see visually if the definition matches. The plots in GUI section 630 for active channels will provide visual indication (e.g., turn green or the like) if they match as shown with plot 1031 in GUI section 630 and if they do not match as shown with plot 1033 in GUI section 630. The user may then operate the authoring tool via the GUI 1020 to open the analyzer window for channels that do not match to investigate the cause. The user can also expand bounding boxes as needed or desired, but the user should be careful to not be too generous with ranges as this can result in an unacceptable number of false positives (or improper triggering of costume control system operation when it is not desired).

The authoring tool can also be used after one or more gestures are authored to train performers to be able to perform each defined gesture in an accurate and repeatable manner. Once gesture definitions have been loaded or created, the authoring tool can be operated, the Run button will be enabled in the authoring tool window/GUI while the authoring tool is in the Recognize mode. By default in some embodiments, the authoring tool will stop once it recognizes or determines that a gesture has been successfully performed or executed by a performer wearing a gesture glove (which is communicatively linked to the computer running the authoring tool). The authoring tool may also highlight the gesture it matched or identified as being successfully performed. The authoring tool may also provide audio and/or visual feedback to the performer being trained (or the trainee) such as with a "ding" or other sound being played and/or a red or other light being provided next to the gesture table list for a time period (e.g., 0 to 1 seconds or the like).

The authoring tool may create and maintain a recognition log. For example, whenever a gesture is recognized or identified as being properly executed or performed, an entry can be logged with a timestamp. The user can then interact with the GUI by clicking on a "Show Log" button or the like to see all gestures that have been recognized in a particular training session. The authoring tool can be further adapted to facilitate adjusting gestures in the recognized operating mode. Any changes made may not be stored until the user attempts to switch to another gesture or operating mode. A confirmation box may be provided in the GUI asking the user to verify that they wish to keep the changes they made, to abandon the changes, or to cancel the action.

When running for training purposes (or as a separate version of the authoring tool), the authoring tool may run in read-only mode so that users (trainees) may load a gesture file but not be able to edit, add, or delete gestures, and the edit gestures and edit template modes of operation may be disabled. The authoring tool is very useful for training performers to execute gestures correctly. The trainees/performers can visually see what happens in the plots provided in the authoring tool GUI as they attempt to perform a gesture. This allows them to adjust their movements accordingly to match the gesture definitions (e.g., bend a particular finger more, move the hand with roll, pitch, or yaw at particular times, and so on).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

While many of the specific examples involved hand gestures and use of a gesture glove for collecting gesture performance data, it should be understood that this system and method is not specific to a glove form factor. Anything from a single push button to a full-body motion tracking system would be a usable form of input. Further, the system and method described herein is not limited to hand gestures as any portion of the performer's body may move to perform a gesture or multiple portions may be moved, and the system and method is, therefore, configured to use one input source-to-many input sources to sense gesture performance.

The system (and method) takes generated data and, through a combination of display, feedback, and aesthetics, the system creates "recognizable data sets." There is no limit on the number of channels the gesture recognition/definition method can recognize as any number of channels greater than zero may be used with the specific examples provided being useful for explaining one non-limiting example with regard to a gesture glove and hand gesture recognition. Further, it will be understood that the described system (and method(s)) is not specific to a costumed performer and/or a walk-around character costume and its control. For example, with regard to the entertainment industry, any cast member (or glove operator or gesture performer) who is on-stage and for whom it is desirable to perform non-obvious input to a system can use the system. In non-entertainment settings, the method and system may be used to define and then later recognize gestures of any operator of a control system that is used to trigger an event or operation by a system controlled by the control system in response to a gesture performance.

The system and method described are configured in some implementations to identify any two or more gestures that are too similar to each other to be accurately performed and/or recognized and mark these for modification (e.g., to have their definitions modified by an aesthetic director). For example, the system and method may make use of regression analysis to provide the system/method the ability to look at its set of defined gestures and call out or identify (flag or send alerts) any that are too similar relative to each other for the system to distinguish between during gesture recognition operations.

Further, it should be noted that the mirroring feature (i.e., the ability to automatically convert data from left to right hand) involves more than just changing a descriptive property. The mirroring feature instead uses logic to identify and note which channels are symmetrical. The mirroring feature then involves running a conversion process across the gesture definitions to change them.

We claim:

1. A method for authoring gesture definitions for use in gesture-based control systems, comprising:

during performance of a gesture by a performer with a plurality of sensors, generating a plurality of sets of raw sensor data each corresponding to differing parameters of the performance of the gesture;

displaying a graphical user interface (GUI) on a display device, wherein the GUI includes graphical plots of the plurality of sets of raw sensor data;

receiving director input identifying a subset of the parameters and storing the identified subset of parameters in a gesture definition, thereby first authoring the gesture definition;

for the graphical plots of the plurality of sets of sensor data corresponding to each of the parameters in the subset of the parameters in the gesture definition, receiving director input defining at least two of a starting position, an ending position, a maximum value, and a minimum value and storing the defined at least two of the starting position, the ending position, the maximum value, and the minimum value in the memory in the gesture definition, thereby second authoring the gesture definition;

receiving additional director input modifying the definition of at least one of the starting position, the ending position, the maximum value, and the minimum value for at least one of the parameters in the subset of the parameters of the gesture definition; and receiving director input defining for at least one of the graphical plots associated with the subset of the parameters used in the gesture definition at least one of a must pass window and a must not pass window defining an area a plot of sensor data must pass or must not pass, respectively, for gesture recognition.

2. The method of claim 1, wherein the director input defining the at least two of the starting position, the ending position, the maximum value, and the minimum value includes positioning a set of bounding boxes in the graphical plots of the plurality of sets of the raw sensor data for the subset of the parameters and sizing the bounding boxes.

3. The method of claim 1, further comprising performing training of an additional performer comprising:

receiving additional sets of raw sensor data each corresponding to differing parameters of performance of the gesture by the additional performer; and comparing the additional sets of raw sensor data with the graphical plots of the plurality of sets of sensor data corresponding to the subset of the parameters in the gesture definition to verify at least one of the starting position, the ending position, the maximum value, and the minimum value are matched.

4. The method of claim 3, wherein the performing training of an additional performer further comprises providing visual or audio feedback to the additional performer indicating whether the performance of the gesture by the additional performer satisfied the gesture definition.

5. The method of claim 4, wherein the providing of the visual or audio feedback comprises a plotting of the additional sets of raw sensor data relative to the graphical plots of the plurality of sets of raw sensor data used to create the gesture definition.

6. The method of claim 1, further comprising defining a length of time for performing the gesture and wherein the length of time is stored with the gesture definition.

7. The method of claim 1, wherein the plurality of sets of raw sensor data include data in a number of channels ranging from 2 to 13 channels, whereby the differing parameters of the performance of the gesture number from 2 to 13.

8. A system for authoring gestures for use by a gesture-based controller, comprising:

a computer with a processor managing a display and a memory device;

a gesture monitoring assembly including a set of sensors sampling data during performance of a gesture by a performer; and a gesture authoring tool run by the processor to:

during the performance of the gesture by the performer, collect sets of sensor data from the sensors;

display a graphical user interface (GUI) on a display device, wherein the GUI includes graphical plots of the sets of sensor data;

generate a gesture definition by receiving user input identifying a subset of the sensors to include in the gesture definition and storing the identified subset of the sensors in the memory device;

for the graphical plots of each of the sensors in the subset of the sensors included in the gesture definition, receiving user input defining at least two of a starting position, an ending position, a maximum value, and a minimum value of the sensor data and storing, in the memory device, the defined at least two of the starting position, the ending position, the maximum value, and the sensor data as part of the gesture definition;

wherein the gesture authoring tool further acts to receive user input defining for one of the graphical plots associated with the subset of the sensors used in the gesture definition at least one of a must pass window and a must not pass window defining, respectively, an area a plot of sensor data must pass for gesture recognition and an area a plot of sensor data must not pass for gesture recognition; and wherein the gesture authoring tool receives additional user input modifying the stored definition of at least one of the starting position, the ending position, the maximum value, and the minimum value for the sensor data for at least one of the sensors in the subset of the sensors included in the gesture definition.

9. The system of claim 8, wherein the user input defining the at least two of the starting position, the ending position, the maximum value, and the minimum value includes positioning a set of bounding boxes in the graphical plots of the sets of the raw sensor data for the subset of the sensors and sizing the bounding boxes.

10. The system of claim 8, wherein the gesture authoring tool performs regression analysis including comparing the gesture definition with at least one previously generated gesture definition to determine whether the gesture monitoring assembly can accurately distinguish performances of a corresponding pair of gestures and, when not, to flag the gesture definition and the at least one previously generated gesture definition for modification.

11. A gesture authoring method, comprising:

collecting a set of data from a plurality of sensors during a data collection window;

receiving first user input defining a gesture performance time period with a start time and an end time for performance of a gesture by a performer during the collecting;

creating a first gesture definition for the gesture including the set of data from a subset of the plurality of sensors during the gesture performance time period;

receiving second user input marking in the first gesture definition, for each of the sensors in the subset of the plurality of sensors, at least two of a start position, an end position, a maximum value, and a minimum value for the set of data;

receiving third user input marking in the first gesture definition, for at least one of the sensors in the subset of the plurality of sensors, at least one of a must pass window and a must not pass window defining an area sensor data must pass or must not pass, respectively, for gesture recognition;

creating a second gesture definition for the gesture comprising a modified version of the first gesture definition including the markings from the second user input and the third user input; and operating a gesture-based control system to generate a control signal when the gesture-based control system determines a performer has performed the gesture defined by the second gesture definition.

12. The method of claim 11, further comprising, prior to the receiving of the second user input, generating a graphical user interface including a graphical plot of the set of data from the sensor and displaying the graphical user interface on a monitor of a computer.

13. The method of claim 12, wherein the receiving of second user input providing the marking includes displaying bounding boxes for the at least two of the start position, the end position, the maximum value and the minimum value and receiving user input placing the bounding boxes relative to the graphical plot and sizing the bounding boxes.

14. The method of claim 12, further comprising receiving fourth user input modifying the marking from the second user input and, in response, creating a third gesture definition comprising a modified version of the second gesture definition.

15. The method of claim 11, further comprising using the second gesture definition for training a performer including collecting additional data from the sensors and comparing the additional data to the graphical plot to verify at least the marked at least two of the start position, the end position, the maximum value and the minimum value are matched.

* * * * *